Feb. 21, 1961 F. Q. RAST 2,972,222

ADAPTOR FOR OPERATING D.-C. TIMING DEVICE ON A.-C. SUPPLY LINE

Filed April 28, 1958 9 Sheets-Sheet 1

INVENTOR
FREDERICK Q. RAST by: [signature]

ATTY.

Feb. 21, 1961 F. Q. RAST 2,972,222

ADAPTOR FOR OPERATING D.-C. TIMING DEVICE ON A.-C. SUPPLY LINE

Filed April 28, 1958 9 Sheets-Sheet 2

INVENTOR
FREDERICK Q. RAST by: [signature]

ATTY.

Feb. 21, 1961 F. Q. RAST 2,972,222

ADAPTOR FOR OPERATING D.-C. TIMING DEVICE ON A.-C. SUPPLY LINE

Filed April 28, 1958 9 Sheets-Sheet 3

INVENTOR
FREDERICK Q. RAST
by: [signature]
ATTY.

Feb. 21, 1961 F. Q. RAST 2,972,222

ADAPTOR FOR OPERATING D.-C. TIMING DEVICE ON A.-C. SUPPLY LINE

Filed April 28, 1958 9 Sheets-Sheet 4

INVENTOR
FREDERICK Q. RAST by:

ATTY.

Feb. 21, 1961 F. Q. RAST 2,972,222

ADAPTOR FOR OPERATING D.-C. TIMING DEVICE ON A.-C. SUPPLY LINE

Filed April 28, 1958 9 Sheets-Sheet 5

INVENTOR
FREDERICK Q. RAST by: H. H. Hulse
ATTY.

Feb. 21, 1961 F. Q. RAST 2,972,222

ADAPTOR FOR OPERATING D.-C. TIMING DEVICE ON A.-C. SUPPLY LINE

Filed April 28, 1958 9 Sheets-Sheet 6

INVENTOR
FREDERICK Q. RAST by: [signature] ATTY.

INVENTOR
FREDERICK Q. RAST
by: [signature]
ATTY

Feb. 21, 1961 F. Q. RAST 2,972,222

ADAPTOR FOR OPERATING D.-C. TIMING DEVICE ON A.-C. SUPPLY LINE

Filed April 28, 1958 9 Sheets-Sheet 8

INVENTOR.
FREDERICK Q. RAST

BY [signature]

ATTY.

Feb. 21, 1961 F. Q. RAST 2,972,222

ADAPTOR FOR OPERATING D.-C. TIMING DEVICE ON A.-C. SUPPLY LINE

Filed April 28, 1958 9 Sheets-Sheet 9

INVENTOR
FREDERICK Q. RAST
by: H. H. [signature]
ATTY.

United States Patent Office 2,972,222

Patented Feb. 21, 1961

2,972,222

ADAPTOR FOR OPERATING D.-C. TIMING DEVICE ON A.-C. SUPPLY LINE

Frederick Q. Rast, New York, N.Y., assignor to General Time Corporation, New York, N.Y., a corporation of Delaware Filed Apr. 28, 1958, Ser. No. 731,343

19 Claims. (Cl. 58—24)

This invention relates generally to a control system for operating step-by-step D.-C. timing devices on a common A.-C. power system, and more particularly to an A.-C. powered adaptor for regularly stepping and remotely controlling a D.-C. device.

A typical master-secondary timing system employs a master clock and a plurality of secondary timers, such as printing recorders, arranged so that each of the recorders is automatically corrected at regular intervals to insure that they remain in synchronism with the master. Conventionally, the recorders are step-by-step D.-C. devices, that is, they operate by advancing in discrete increments, usually minute by minute, in response to impulses received over a special D.-C. line. At the end of a predetermined interval, usually on the hour, the master clock initiates a correcting signal which is received by the recorders and operates to bring the latter into synchronism with the master.

A particular and commonly utilized operating and correcting device for a secondary timer in such a system is known as an auto-set mechanism, and is fully disclosed and described in U.S. Patent 2,332,828 issued October 26, 1943. For purposes of the present disclosure it will be sufficient to observe that auto-set mechanisms of this type periodically require a rapid series of D.-C. corrective impulses having a polarity which is the reverse of the normal minute-by-minute D.-C. impulses used to step the timer. These reverse polarity corrective impulses are usually supplied to the auto-set mechanism from the master clock over a definite time interval toward the end of each hour.

Briefly, the auto-set mechanism accomplishes its correcting function by locking its actuating solenoid if a current impulse of reverse polarity is received and the timing device is "on time." If the timer is slow when the master clock initiates the rapid corrective impulse series, the locking means is disabled and the rapid impulses quickly advance the timer setting until the timer has been corrected and the locking means is made effective to lock the solenoid against the remaining series of impulses. With the next impulse of normal polarity the clock advances normally.

Thus, it may be seen that the auto-set mechanism of a secondary timing device must be provided both with regular minute, or other fixed interval, D.-C. impulses for normally advancing the timer setting, and with a series of rapid corrective impulses of reverse polarity initiated by, and under the control of, the master clock for keeping the secondary timer in synchronism with the master. The advantages of reliable and precise synchronization provided by the auto-set mechanism have not been conventionally available for printing recorders except through the use of a special D.-C. control line as mentioned above.

It is therefore the general aim of the present invention to provide a compact adaptor combining the functions of a coded signal responsive relay and a multiple function A.C. to D.C. impulse converter for operating and remotely controlling an auto-set equipped timing device, such as a recorder, on a common A.-C. line. It is a related object to provide a device of this type which can be operated on any A.C. power system, regardless of voltage or frequency, for which a synchronous electric timing motor is available.

It is also an object to provide an adaptor of the above type which will perform any of at least three desired functions in response to predetermined coded signals. It is a collateral object to provide such an adaptor whose response is limited to preselected coded signals so that additional equipment can be controlled on the same common carrier line with other signals at the same frequency.

It is a further object to provide a signal responsive adaptor as described above which ignores and is nonresponsive to spurious or transient signals at the control signal frequency, often referred to as "noise." In more detail, it is an object to provide an adaptor as characterized above which mechanically measures each signal impulse received and which will reset itself if the impulse is not of proper duration so that noise accumulations will not falsely actuate the adaptor.

It is another object to provide a novel adaptor for an auto-set equipped device that will automatically supply a D.-C. impulse to the device every minute, or any other predetermined interval, and will correct the device, upon appropriate signals, of up to a 59 minutes' slow error every hour and up to an eleven hours and 59 minutes' slow error every twelve hours. It is a correlated object to provide an adaptor of this type which, after a general power failure, will respond to hourly correction signals repeated every two minutes so as to quickly bring the timing device up to an accurate, correct reading.

It is a still further object to provide an adaptor as characterized above which begins and ends its correction impulse cycles before the last minute of the hour and which assures that the hourly reading of the timing device will be correct to the nearest second.

It is yet another object to provide an adaptor having the above operating characteristics which also, in response to a predetermined signal, will discontinue transmitting minute impulses to the timing device for one hour before resuming normal operation so that a one-hour delay time adjustment, as required for daylight saving time correction, can be easily made.

Moreover, it is an object to provide an adaptor as set forth above, that is positive acting, reliable, and relatively economical to manufacture.

Other objectives and advantages of the invention will become apparent upon reading the attached detailed description and upon reference to the drawings in which.

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

Figure 14:
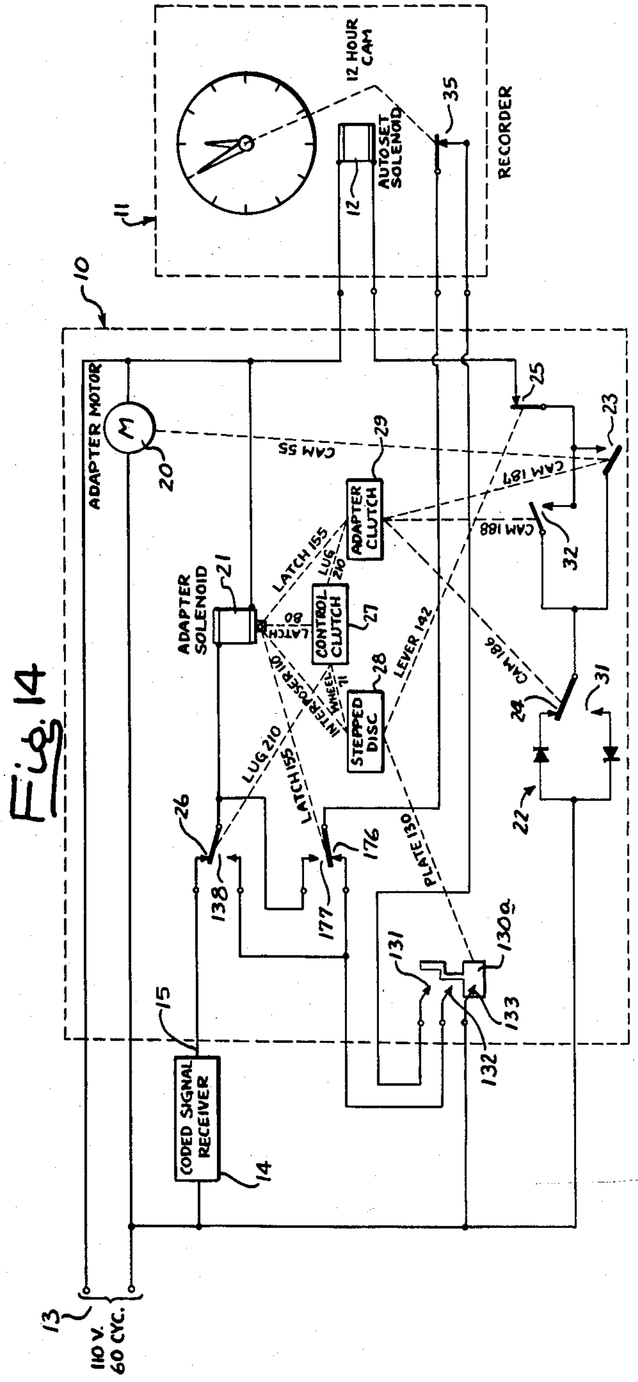
Fig. 14 is a schematic wiring and function diagram showing the electrical circuit embodied in the adaptor and indicating the elements of the adaptor controlling the electrical circuit.

Turning first to Fig. 14, there is shown a schematic wiring and function diagram of an adaptor 10 constructed in accordance with the present invention. The adaptor is operably connected to a recorder 11 which utilizes an auto-set mechanism of the type identified above which includes an actuating solenoid 12. The adaptor is electrically connected to an A.-C. power system 13 and is coupled with a coded signal receiver 14. The receiver 14 is preferably a conventional unit effective to sense a signal at a desired frequency transmitted on the system 13, and to operate as a relay converting a high frequency signal impulse to an A.-C. impulse transmitted by a connector 15 to the adaptor 10.

The adaptor includes a constant speed synchronous motor 20 coupled to the power system 13, an adaptor solenoid 21 capable of being energized by an A.-C. impulse, and a rectifier 22 for supplying D.-C. source needed to energize the auto-set solenoid 12.

*Outline of adaptor functions*

To provide regularly timed, D.-C. impulses to the auto-set solenoid 12, the adaptor motor 20 intermittently closes normally open contacts 23 and thereby completes a circuit from the rectifier 22 through normally closed contacts 24 and 25 to the auto-set solenoid 12. Preferably, the contacts 23 are closed once every minute so that the recorder 11 is advanced minute-by-minute each time the solenoid 12 is energized.

Every hour, a master control clock, not shown, sends out a coded signal on the power system 13 to which the adaptor 10 is responsive. If the proper hourly correction code is received by the adaptor, it will be effective to transmit the hourly code correction impulses to the recorder 11.

Each signal impulse of the code transmitted by the power system 13 is effective, through the coded signal receiver 14, to energize the adaptor solenoid 21 through the connector 15 and the normally closed contacts 26. A control clutch 27 and a stepped disc assembly 28 respond to the energization of the solenoid 21, and if the proper pattern of coded signal impulses is received, an adaptor clutch 29 is engaged.

Engagement of the adaptor clutch reverses the polarity of the D.-C. source by opening the normally closed contacts 24 and closing the normally open contacts 31, while simultaneously blocking open the contacts 23 and preventing their further operation during the remainder of the adaptor clutch cycle. Thereafter, the adaptor clutch rapidly opens and closes the normally open contacts 32 so as to send a rapid series of reverse polarity D.-C. impulses to the auto-set solenoid 12 through the contacts 31 and the closed contacts 25. In the illustrated embodiment, the contacts 32 are opened and closed 61 times so that the recorder 11 will be brought up to exact time although initially up to one hour late.

Every twelve hours the master clock transmits on the power system 13 a 12-hour correction signal to which the adaptor 10 is responsive. In order to correct the recorder 11 when it is as much as 12 hours slow, the recorder is provided with a normally closed switch 35 which is opened by the recorder for a predetermined period every 12 hours. If a 12-hour correction signal is received by the adaptor 10 during this predetermined period, and the recorder is slow so that the switch 35 is still closed, a circuit is completed through the switch 35 locking in the adapter solenoid 21 so that the adaptor clutch 29 is repeatedly cycled. Each time the adaptor clutch cycles, it is effective, in the manner described above, to reverse the polarity of the D.-C. source and to transmit a rapid series of D.-C. impulses through the normally open contacts 32 to the auto-set solenoid 12.

The adaptor clutch 29 will keep cycling until the recorder 11 is advanced far enough to open the normally closed switch 35. This will drop out the solenoid 21 and normal operation of the recorder will proceed; with the recorder having been brought up to the correct time after having been slow as much as 11 hours and 59 minutes.

The recorder 10 is also responsive to a special signal which is sent when it is desired to interrupt operation of the recorder 11 for a predetermined interval. This need may arise when it is desired to set back the recorder one hour to compensate for a change in the time system caused by daylight saving time. To accomplish this, a special signal is transmitted on the power system 13 that causes the adaptor solenoid 21 to operate the control clutch 27 and the stepped disc 28 in such a way that the normally closed contacts 25 are locked open. It will thus be seen that subsequent operation of the normally open contacts 23 and 32 will be unable to transmit D.-C. impulses to the auto-set solenoid 12 and therefore the recorder 11 will not be advanced as long as the switch 25 remains locked open.

The adaptor is arranged so that upon receiving the next hourly correction signal, which causes operation of the control clutch 27 and the stepped disc 28, the contacts 25 are unlocked and allowed to assume their normally closed relation, whereupon the circuit from the contacts 23 and 32 is again completed to the auto-set solenoid 12 and normal operation of the recorder can be resumed.

*General arrangement of the adaptor*

Figure 1:
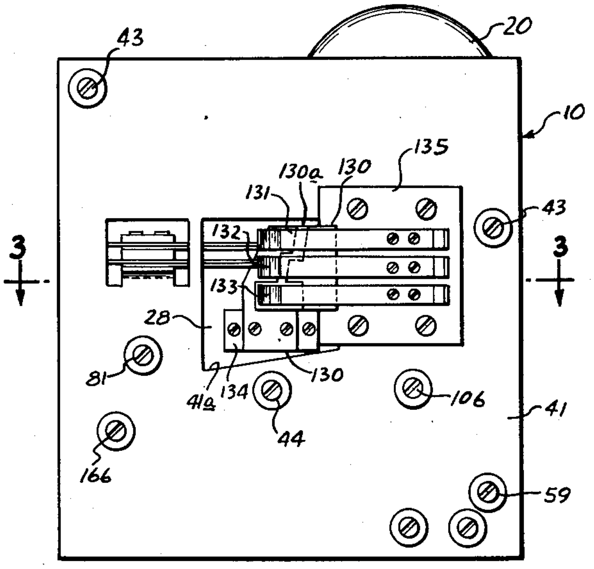
Figure 1 is an elevation view of the complete adaptor assembly.
Figure 3:
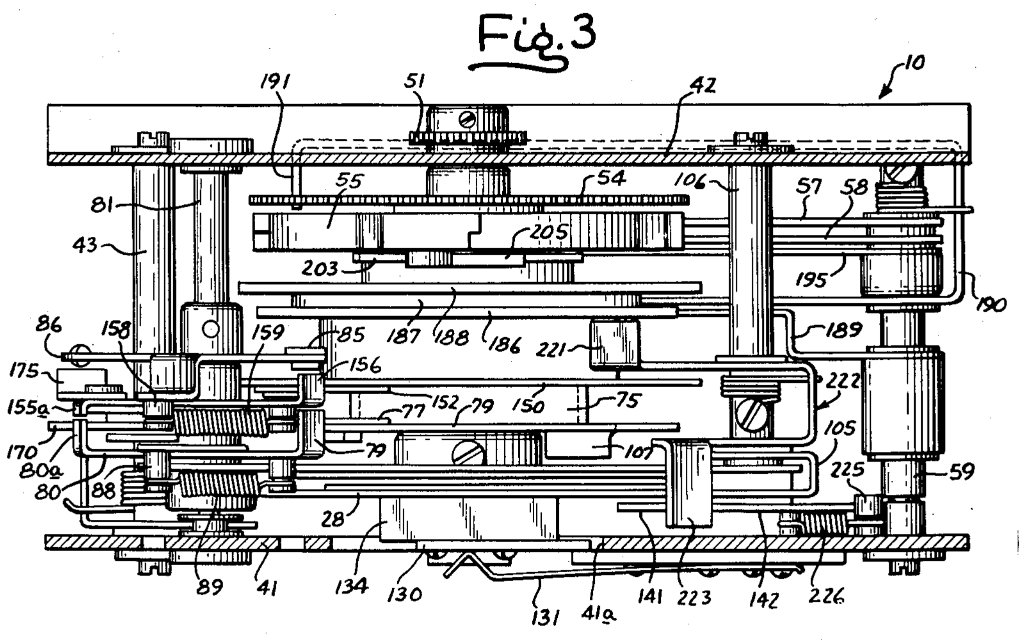
Fig. 3 is a section taken along the line 3—3 of Fig. 1.
Figure 2:
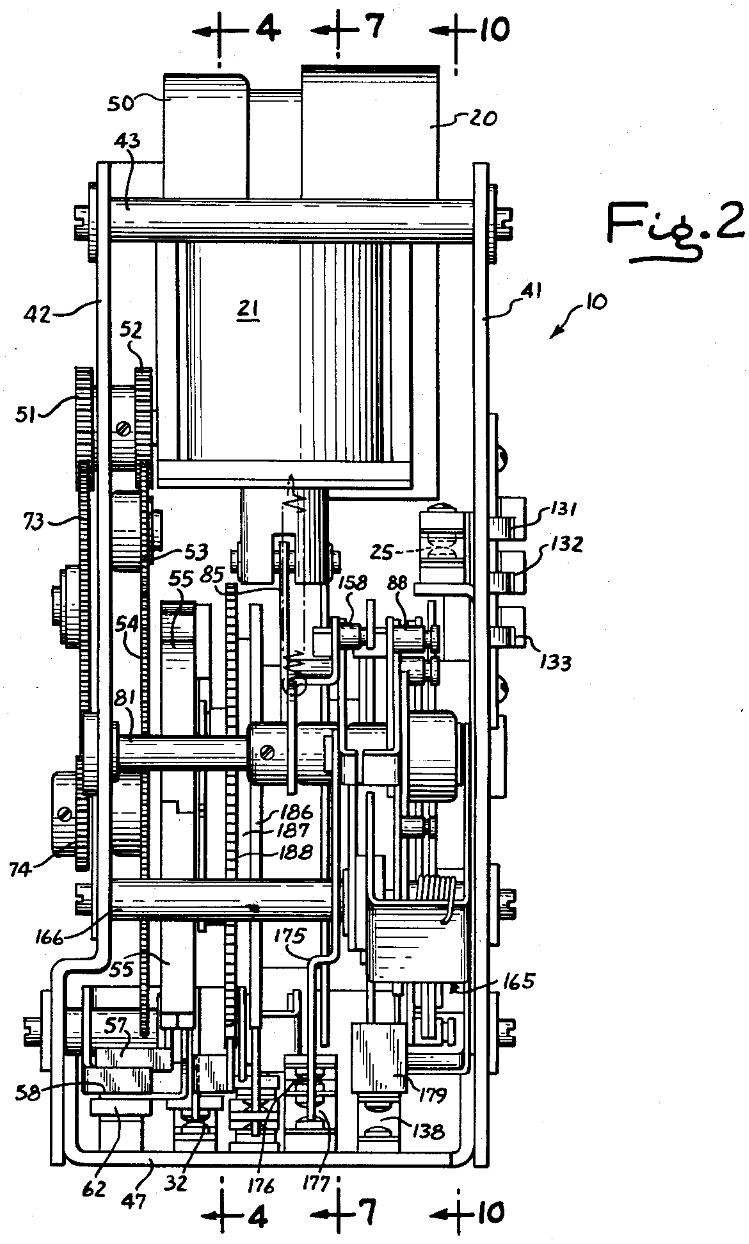
Fig. 2 is an end view from the left of the assembly shown in Figure 1.

Having the above functions of the adaptor 10 in mind, attention will next be directed to the general arrangement of the adaptor parts as shown in Figs. 1, 2 and 3. The adaptor 10 includes a front frame plate 41 coupled to a back frame plate 42 by a series of spaced posts 43. The adaptor motor 20 is secured to the inner surface of the back frame plate 42 (see Fig. 4), and the adaptor solenoid 21 is likewise mounted on the back frame plate.

The adaptor 10 also includes a centrally located, main drive shaft 44 on which the majority of a series of switch operating cams are mounted. A majority of the electrical contacts, including contacts 23, 24, 31 and 32, are carried by resilient switch arms mounted in arrays of insulated switch blocks 45 and 46 (see Fig. 7) which are positioned on a bracket plate 47 secured to the back frame plate 42 (see Fig. 2).

*Minute impulse control*

Figures 4, 5:
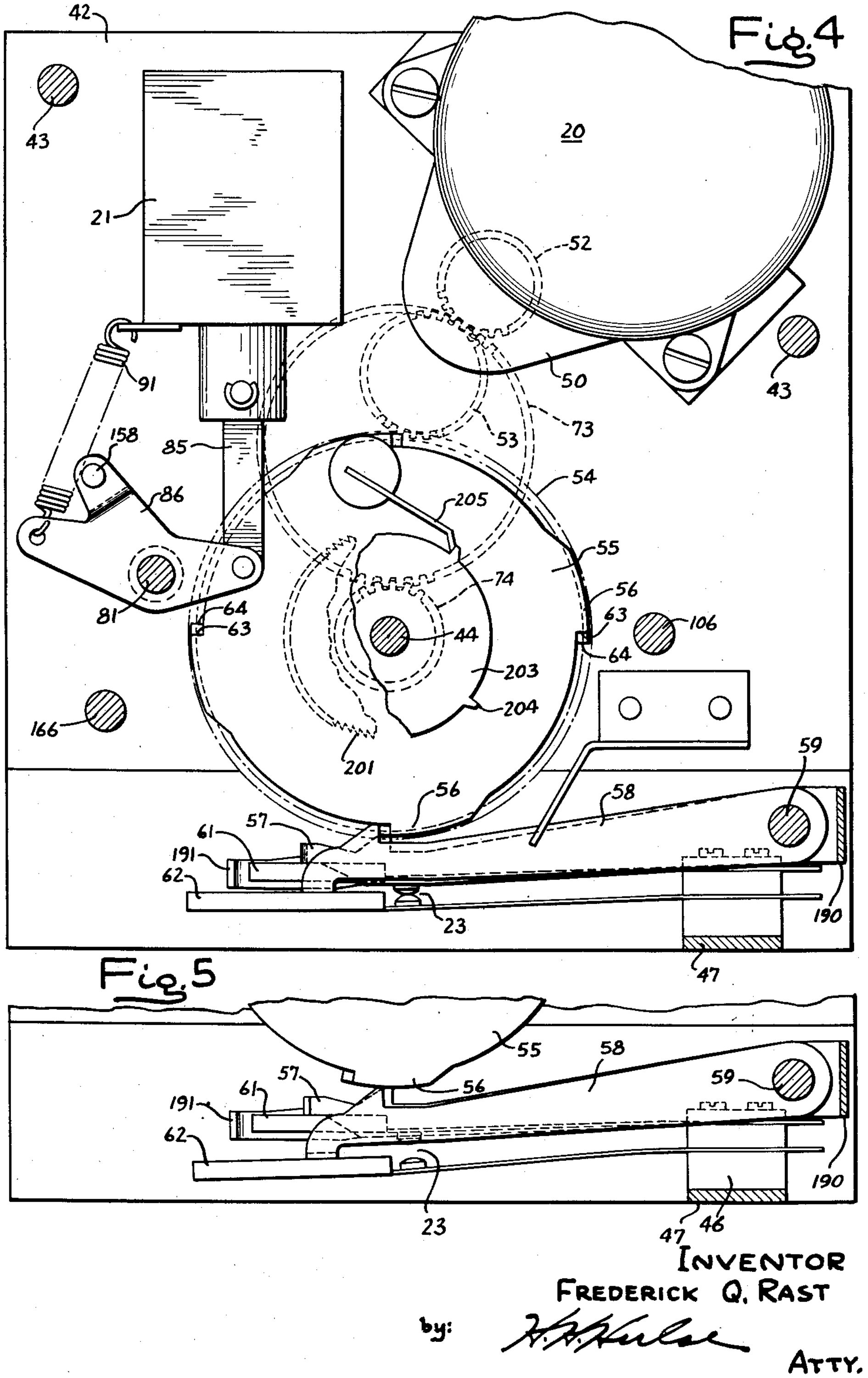
Fig. 4 is a section taken approximately along the line 4—4 of Fig. 2 but with the motor and solenoid parts shown in elevation for clarity of illustration.
Fig. 5 is a fragmentary view similar to Fig. 4 showing the parts in a different operating position.
Figures 6, 8, 9:
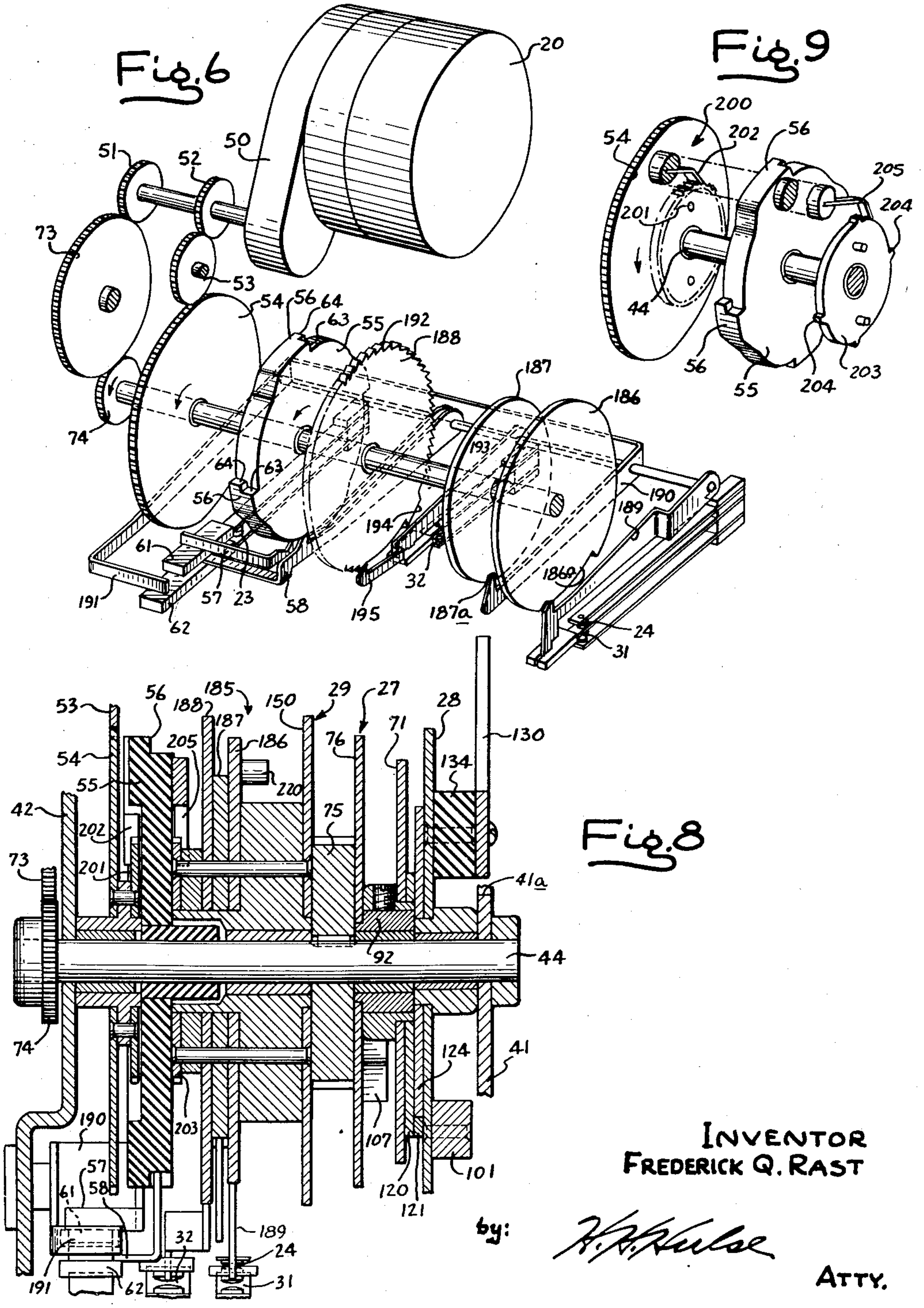
Fig. 6 is an exploded perspective view showing the driving train and switch operators of the adaptor.
Fig. 8 is a section taken along the line 8—8 of Fig. 7.
Fig. 9 is an exploded perspective view of the clutch elements shown in Fig. 8.

Attention will next be given to the structure by which the constantly driven motor 20 regularly operates the switch 23 once each minute. With particular reference to Figs. 2, 4 and 6, it will be observed that the motor 20 drives, through a speed reduction gear box 50, a double pinion gear 51, 52. The pinion 52, through an idler 53, constantly rotates a gear 54 which is carried freely on the main drive shaft 44. The constantly rotated gear 54 is rotatably coupled to a switch operating cam 55 which is effective to open and close the contacts 23.

In the preferred embodiment, the cam 55 has four peripherally spaced operating lobes 56, and the gears 52, 54 are selected so that the cam rotates at ¼ r.p.m. in a counter-clockwise direction as seen in Fig. 4. In order to operate the contacts 23, the cam 55 is associated with an adjacent pair of switch operating levers 57, 58, which are loosely pivoted on a post 59 extended between the front and back plates 41, 42 of the adaptor. The lever 57 rides on the periphery of the cam 55 and urges downwardly a resilient spring arm 61 on which the upper one of the contacts 23 is mounted. The lever 58 also rides on the periphery of the cam 55 and urges downwardly a resilient spring arm 62 on which the lower one of the contacts 23 is carried. The arms 57, 58 are proportioned so that when they engage the periphery of the cam 55 at points equally distant from the cam's axis the arm 62 is depressed below the arm 61 so that the contacts 23 are held open (see Fig. 5).

In order to close the contacts 23 for a predetermined time, each of the cam lobes 56 is provided with a pair of peripherally spaced drop-off portions 63, 64, which cooperate with the levers 57, 58 respectively. As the cam 55 rotates, the levers 57, 58 are biased against the cam periphery by the contact carrying spring arms 61, 62 so that the levers ride up onto the cam lobes 56. Continued rotation of the cam 55 permits the lever 58 to be released by the drop-off portion 63 and swing upwardly, permitting the contact carrying arm 62 to flex upwardly so that the contacts 23 are closed. Further movement of the cam results in the arm 57 being released by the cam drop-off portion 64, whereupon the contact carrying arm 61 is allowed to flex upwardly and the contacts 23 are again opened. The contacts 23 remain open as long as the levers 57, 58 remain at the same radial distance from the center of the cam 55.

As pointed out above, the cam 55 rotates at a constant speed of ¼ r.p.m. and is provided with four equally spaced cam lobes 56 each having spaced drop-off portions 63, 64. It will therefore be apparent that the contacts 23 will be closed once each minute. In the preferred embodiment, the spacing of the drop-off portions 63, 64 is such that the contacts remain closed for approximately two seconds so that two-second current impulses of normal polarity are transmitted to the auto-set solenoid 12 (see Fig. 14).

*Coded receiver structure*

The coded receiver portion of the adaptor 10 is effective to recognize and respond to the various coded signals transmitted to the adaptor and to cause the adaptor to perform its various functions upon receiving the proper coded signal. The coded receiver portion includes the control clutch 27 (see Fig. 12) which is a one-revolution clutch that is effective to rotate a toothed wheel 71 (see Fig. 10) during its operating cycle. The wheel 71, together with the solenoid 21, are effective to advance a stepped disc 28 (see Fig. 11) if a proper coded signal is received, and the disc 28 conditions the adaptor for performing the desired function.

Turning first to the control clutch 27 and with particular reference to Figs. 6, 8, 10 and 12, it will be seen that the motor 20 constantly rotates the drive shaft 44 through a pinion 51, an idler 73, and a gear 74 non-rotatively mounted on the drive shaft 44. Fixed on the drive shaft 44 is a drive ratchet 75, and it may be noted that this is the only member carried by the drive shaft between the front and rear frame plates 41, 42 which is non-rotatively secured to the drive shaft.

Figure 10:
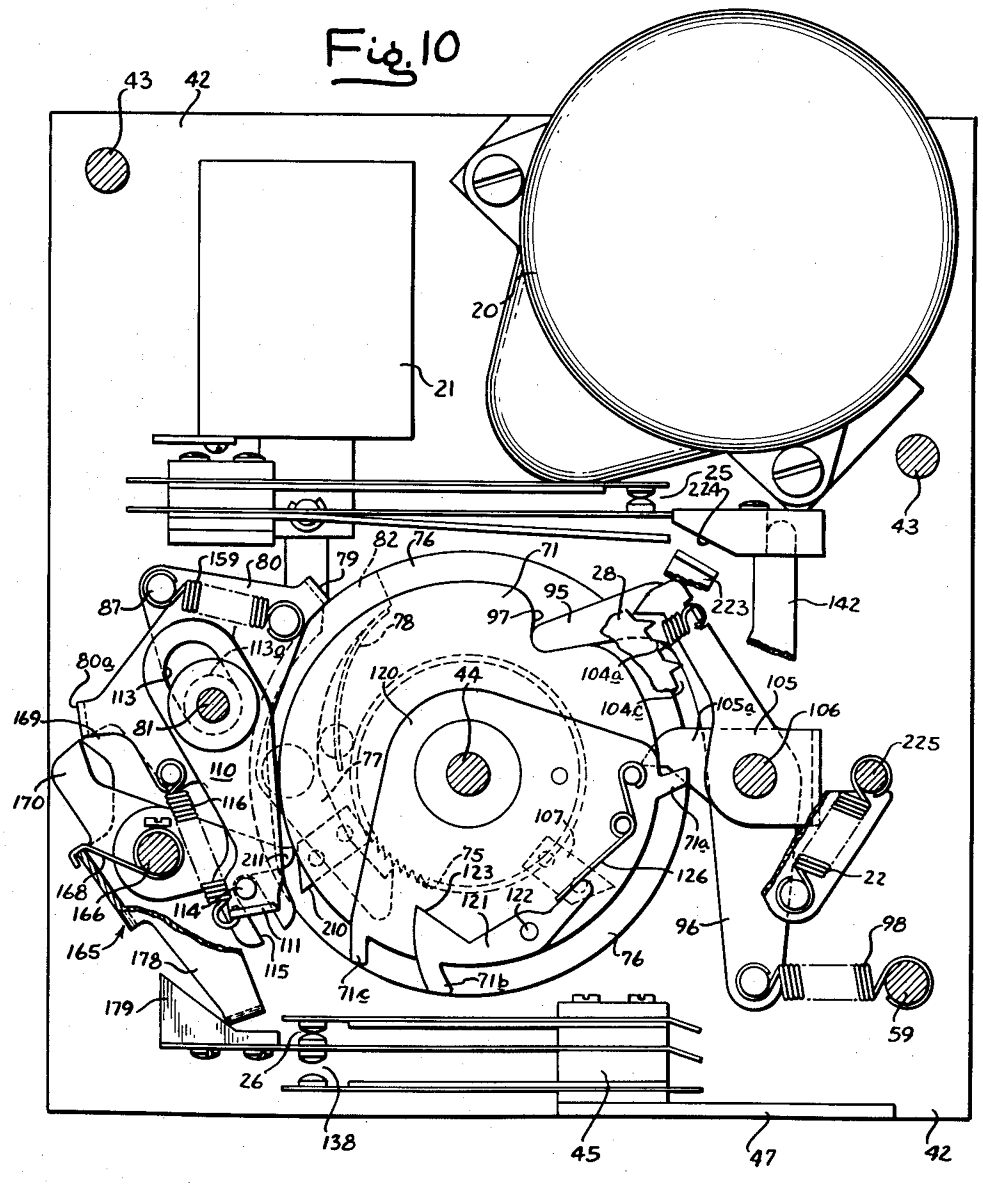
Fig. 10 is a section taken along the line 10—10 in Fig. 2 with the stepped disk and printed circuit switch removed.

The sizes of the idler 73 and the gear 74 are selected so that the drive shaft 44 and the drive ratchet 75 rotate at 1 r.p.m in a counter-clockwise direction as viewed in Fig. 10.

The one-revolution control clutch 27 is cycled only upon the sustained energization of the solenoid 21. For this purpose, the clutch includes a disc 76 carrying a pivoted pawl 77 which is spring-urged by a leaf spring 78 (see Fig. 10) toward engagement with the constantly driven ratchet 75. The pawl 77 is held out of engagement with the drive ratchet 75 by a finger 79 on a clutch latch 80 which is loosely pivoted on a rotatable post 81. The post 81 is journalled at each end in the frame plates 41, 42. The latch finger 79 engages an elongated tail portion 82 of the pawl 77 and rests against the periphery of the clutch disc 76.

In order to initiate operation of the control clutch 27, the solenoid 21 is coupled through a link 85 and a lever 86 to the rotatable post 81 so that energization of the solenoid rotates the post. Non-rotatively mounted on the post 81 is an arm 87 carrying a pin 88 that is coupled to the latch 80 by a tensioned helical spring 89. The arrangement is such that energization of the solenoid 21 will rotate the arm 87 so as to tension the spring 89 and pull the latch finger 79 from the clutch disc 76, thereby allowing the pawl 77 to engage the drive ratchet 75.

To maintain the latch 80 in its normal position with the finger 79 against the disc 76, the pin 88 abuts a ledge 90 formed on the latch 80 under the urging of a tensioned spring 91 attached to the lever 86.

It will therefore be seen that energization of the solenoid 21 will rotate the post 81 against the resistance of the spring 91 so as to move the pin 88 from the ledge 90 and pull, through the spring 89, the latch 80 from the clutch disc 76. This will allow the pawl 77 to be urged by its spring 78 into contact with the drive ratchet 75 and the clutch disc 76 will start rotating in a counter-clockwise direction at the speed of the drive ratchet, i.e. 1 r.p.m.

Because of the elongated tail 82 on the pawl 77, the solenoid 21 must remain energized for the period required to turn the tail portion 82 of the pawl 77 from beneath the finger 79 on the latch 80. If the solenoid is de-energized after only a brief period, the spring 91 will cause the pin 88 to swing the latch 80 against the clutch disc 76 and thereby engage the elongated tail 82 of the pawl 77 and interrupt rotation of the control clutch. The tail 82 is preferably proportioned so that approximately a three-second interval is required for the pawl tail to be carried by the disc 76, rotating at 1 r.p.m., from under the latch finger 79.

It will also be noted that a lost motion connection between the solenoid 21 and the latch 80 is provided by the spring 89, and the purpose of this lost motion connection will be made plain below.

Turning next to the manner in which the control clutch 27 drives the toothed wheel 71, it will be noted that the clutch disc 76 is mounted on a sleeve 92 rotatably carried on the drive shaft 44 and which also carries the toothed wheel 71. It will therefore be seen that when the control clutch 27 is cycling, it drives the toothed wheel 71 through one revolution.

To retain the clutch disc 76 and the toothed wheel 71 in their normal rest positions, a nose 95 of a pawl 96 (see Fig. 10) is seated in a notch 97 formed in the periphery of the toothed wheel 71. The pawl 96 is resiliently urged by a spring 98 in a counter-clockwise direction, and the engagement of the pawl nose 95 with the recess 97 restrains the clutch disc and toothed wheel assembly in their normal position.

It will also be observed that the notch 97 has downwardly-sloping sides so that if the clutch pawl 77 is disengaged from the ratchet 75 by the latch 80 striking the tail 82 of the pawl 77 before the latter has passed beneath the latch finger 79, then the resiliently urged pawl nose 95 will exert a camming force against the sides of the recess 97 that will be effective to return the toothed wheel 71 and the cam disc 76 back into their original positions. This construction makes it impossible for a series of short, irregular current impulses, or "noise," to initiate operation of the control clutch 27 by repeatedly energizing the solenoid 21 for brief periods, since after each period of solenoid energization and the resulting short advance of the clutch disc the camming action of the pawl 96 will return the disc 76 to its starting or normal position.

Figure 11:
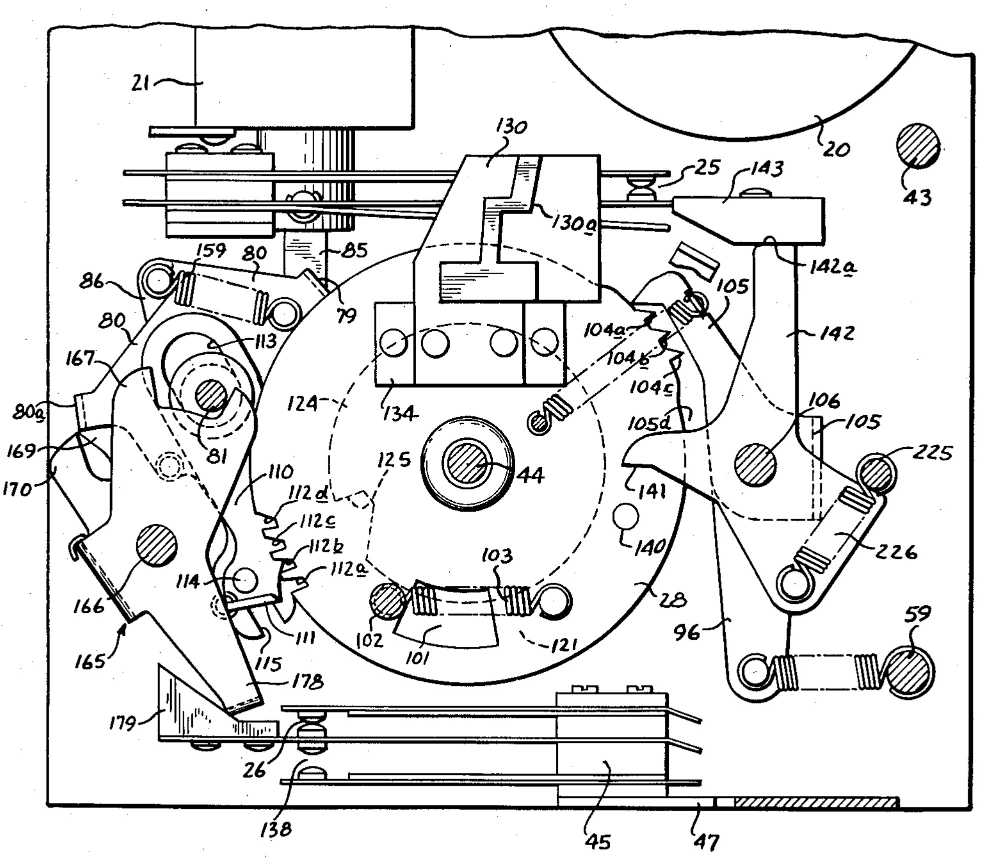
Fig. 11 is a section similar to Fig. 10 with the stepped disk and printed circuit switch in place.

Considering next the stepped disc 28 and in particular Figs. 8 and 11, it may be noted that the disc is rotatably mounted on the drive shaft 44 and carries a stop block 101 which abuts a pin 102 secured to the front frame plate 41 and which establishes a rest position for the disc. A tensioned spring 103 extends between the pin 102 and the disc so as to resiliently hold the disc in its rest position.

For establishing a plurality of stepped positions, the disc 28 is provided with a number of peripherally extending teeth 104*a*–104*c*. Cooperating with the teeth is a spring-urged pawl 105 which is pivoted on a post 106 extending between the front and back frame plates 41, 42 of the adaptor. It will be seen that as the stepped disc is rotated in a counter-clockwise direction, as seen in Fig. 11, the pawl 105 will engage the successive teeth 104*a*–104*c* so that the stepped disc may be latched in any one of three angular positions. As will be brought out below, the position in which the stepped disc is latched depends upon the particular coded signal received by the adaptor.

For the purpose of releasing the stepped disc so that it may return under the urging of the spring 103 to its rest position, the pawl 105 is provided with an interconnected arm 105*a* which extends into the path of a lug 107 (see Figs. 10 and 12) that is mounted on the front face of the control clutch disc 76. It may therefore be seen that each time the control clutch 27 is cycled, the lug 107 will engage the arm 105*a* and swing the pawl 105 in a clockwise direction (Fig. 10) so that it clears the teeth 104*a*–104*c* and allows the stepped disc 28 to return to its rest position with the lug 101 engaging the stop pin 102.

Figures 12, 13:
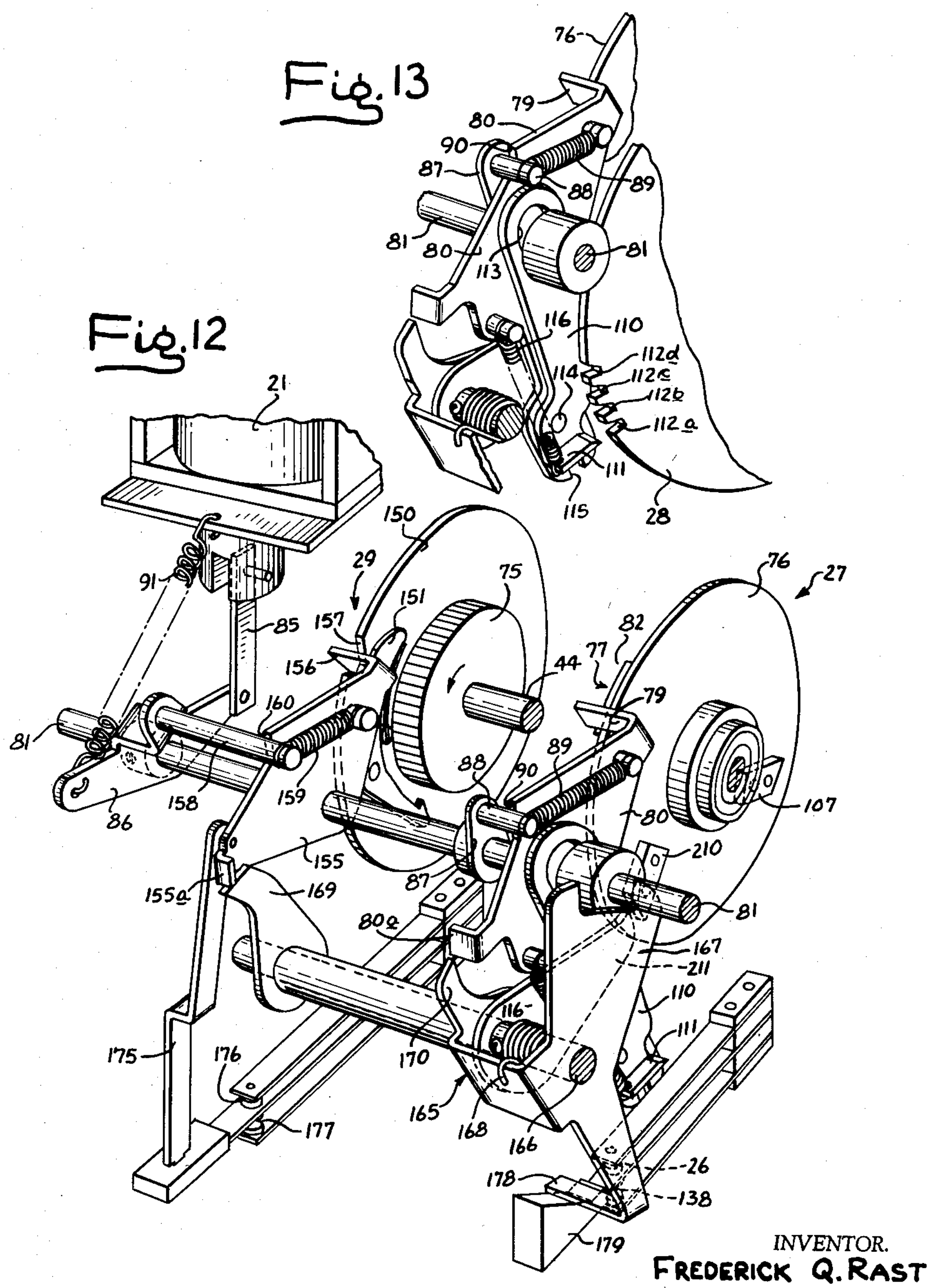
Fig. 12 is an expanded perspective view of the solenoid operated clutch release shown in Fig. 10, with certain parts being distorted for clarity of illustration.
Fig. 13 is a perspective view similar to Fig. 12 showing the stepped disk operating slide.

In order to advance the stepped disc 28 in response to predetermined coded signals, the toothed wheel 71 is provided with radially extending teeth 71*a*–71*c* and an interposer 110 is slidably mounted on the latch 80 (see Figs. 10 and 13). The interposer 110 has a foot 111 adapted to be swung into one of a series of notches 112*a*–112*d* formed in the periphery of the stepped disc 28. When the interposer foot 111 is swung into one of the notches 112*a*–112*d*, it is also disposed in the arcuate path of the teeth 71*a*–71*c* on the tooth wheel 71 so that if the swinging of the foot into one of the notches coincides with the passing of one of the teeth, the tooth will strike the foot, pull the interposer 110 downwardly and rotate the disc 28.

Turning more particularly to the mounting of the interposer 110 and Figs. 10 and 13, it will be seen that the upper end of the interposer is provided with a slot 113 which slides on a bushing 113*a* (see Fig. 10) carried by the post 81. At its lower end, the interposer 110 is provided with a pin 114 that slides in a notch 115 formed in the bottom of the latch 80. A tensioned spring 116, extended between the interposer foot 111 and the latch 80, urges the interposer upwardly until the bottom of the slot 113 abuts the bushing 113*a*.

It will now be understood that when energization of the solenoid 21 is effective to operate the latch 80, the interposer 110 is swung with the latch so that the interposer foot 111 enters one of the notches 112*a*–112*d* formed in the stepped disc 28. The sliding mounting of the interposer 110 on the latch 80 permits the interposer to be drawn downwardly when the interposer foot 111 is struck by a passing tooth on the toothed wheel 71. When the latch 80 is returned to its normal position so as to swing the foot 111 away from the toothed wheel 71, the spring 116 will be effective to restore the interposer to its rest position on the latch 80.

Since coded signal impulses result in the energization of the solenoid 21 and movement of the interposer foot 111 into one of the stepped disc notches, and since this movement of the interposer foot must coincide with the passing of one of the toothed wheels 71 in order to advance the stepped disc, it will now be apparent that the relative angular positions of the teeth on the toothed wheel will be effective to establish the particular signal impulse code to which the adaptor 11 will be responsive. In order to permit the adaptor to be readily modified so as to respond to any desired code pattern, the teeth 71*a*–71*c* are carried by a separate disc segment 120 that is releaseably secured to the toothed wheel 71. The teeth 71*a* and 71*c* are formed integrally with the segment 120 and the tooth 71*b* is formed as part of a pawl 121 which is pivoted at 122 on the disc segment 120 for a purpose discussed below. Substitution of a different disc segment having a different positional arrangement of teeth for the segment 120 will therefore be effective to vary the coded signal pattern to which the adapter 10 will respond.

As a feature of the invention, the adaptor is not responsive to transient signal impulses or "noise." As pointed out above, the elongated tail 82 on the control clutch pawl 77, and the slopping sides of the positioning notch 97, prevent initiation of the control clutch cycle unless the solenoid 21 remains energized for a sustained, predetermined period. It will also be observed that the interposer foot 111 must be maintained in one of the notches 112*a*–112*d* by the sustained energization of the solenoid 21 for a period long enough for one of the teeth 71*a*–71*c* to carry the stepped disc 28 sufficiently far for the pawl 105 to "pick-up" one of the teeth 104*a*–104*c*. If the solenoid is not operated for this sustained period, the interposer foot 111 will be withdrawn from the notch 112 and the stepped disc will be free to swing back under the urging of the spring 103 to its former position.

In order to avoid actuation of the adaptor 10 by a false code, the pawl 121, which carries the tooth 71*b*, has a cam follower point 123 that rides on the periphery of a cam 124 secured to the back side of the stepped disc 28 (see Figs. 8 and 11). The cam 124 has a single drop-off portion 125, adapted to receive the pawl point 123 and allow the pawl 121 to swing about its pivot 122 under the urging of a torsion spring 126 When the point 123 is received in the cam notch 125, the tooth 71*b* is swung inwardly from the periphery of the toothed wheel 71 and out of the path of the interposer foot 111. Thus, if the pawl is swung into the cam notch 125, the tooth 71*b* will not be effective to advance the stepped disc 28 even though the interposer foot 111 is swung into one of the notches 112 as the tooth rotates past.

The cam 124 is secured to the stepped disc 28 in an angular position arranged so that the tooth 71*b* will be retracted as it passes the interposer foot 111 unless the stepped disc has been advanced one step. That is, the cam notch 125 is positioned so that the tooth 71*b* will be retracted just before it reaches the notch 112*a*. Thus, if the interposer foot 111 is disposed in the notch 112*a* the tube 71*b* will be ineffective to advance the stepped disc. If, however, the disc has already been advanced one step and the interposer foot 111 swings into the notch 112*b*, the angular position of the cam notch 125 is also advanced and the tooth 71*b* will be effective to engage the interposer foot and advance the stepped disc.

In effect, this means that a first coded signal impulse must be received by the adaptor 10 when the tooth 71*a* swings past the notch 112*a* so that the interposer foot 111 is swung into the notch and engaged by the foot. This advances the stepped disc one step so that the pawl 105 engages the tooth 104*a*. The stepped disc may then be advanced a second step by the tooth 71*b* if another signal impulse is received to swing the interposer foot 111 into the notch 112*b* as the interposer foot 71*b* passes.

In order that the stepped disc 28 may condition the adaptor 10 for performing any selected one of its several functions, the stepped disc is provided with a printed circuit plate 130 which cooperates with three spaced contacts 131, 132, 133. The plate 130 is mounted on a block 134 so as to extend forwardly of the stepped disc 28 and lie in an opening 41*a* cut into the front plate 41. The contacts 131–133 are secured to an insulating sheet 135 mounted on the front side of the plate 41.

The plate 130 has a printed zig-zag electrical conductor 130*a* dimensioned so that when the stepped disc is advanced one step, the contacts 132 and 133 are electrically joined; and when the disc is advanced a second step, the contacts 131 and 133 are electrically joined and the contact 132 is open. With reference to Fig. 14, it will be seen that closing of the contacts 132 and 133 is effective to permit operation of the adaptor solenoid 21 by the control clutch 27 through a set of contacts 138. Closing the contacts 131 and 133 is effective to establish a control circuit for the solenoid 21 through the 12-hour switch 35 in the recorder 11.

When the stepped disc 28 is moved into its third stepped position, that is, when the pawl 105 engages the tooth 104*c*, the conductor 130*a* is carried past the contacts 131 and 132 and no circuit is completed from the contact 133.

*Adaptor structure*

Consideration will next be given to the adaptor clutch 29 as shown particularly in Figs. 7, 8 and 12. It will be seen that the adaptor clutch 29 is a one-revolution clutch much like the control clutch 27 and incorporates a clutch disc 150 journaled on the drive shaft 44 adjacent the drive ratchet 75. A pawl 151 is pivotally mounted on the clutch disc 150 and a spring 152 is provided to resiliently urge the pawl into engagement with the ratchet 75.

To control the operation of the adaptor clutch 29, a latch 155, similar to the latch 80, is provided. The latch 155 has an offset finger 156 which seats within a peripheral notch 157 formed in the clutch disc 150 and is effective to hold the pawl 151 out of engagement with the ratchet 75. The seating of the finger 156 in the notch 157 also establishes a normal rest position for the clutch 29.

In order to operate the latch 155, the lever 86 is provided with a pin 158 which is coupled to the latch by a tensioned spring 159. Rocking of the lever 86 upon the energization of the solenoid 21 will tension the spring 159 and pull the latch member 155 away from the pawl 152 so as to initiate the one revolution cycle of the clutch 29. The latch 155 is restored upon the de-energization of the solenoid 21 by the pin 158 abutting a surface 160 on the latch 155 under the influence of the spring 91.

It may now be seen that the clutch discs 76 and 150 of the control clutch and the adaptor clutch, respectively, sandwich between them the constantly rotated drive ratchet 75, and that both of these clutches may be operated upon energization of the single solenoid 21. It will be observed, however, that the springs 89 and 159, respectively, provide lost motion connections between the solenoid and the latches 80 and 155 which initiate operation of the respective clutches.

In order to selectively initiate a one-revolution cycle of either the control clutch 27 or the adaptor clutch 29 upon energization of the solenoid 21, a lock-out assembly 165 is provided (see Figs. 11 and 12). The lock-out assembly is pivotally mounted on a post 166 extending between the front and rear frame plates 41, 42 and is provided with a bifurcated arm 167 loosely embracing the post 81 so as to establish limit positions between which the assembly 165 may rock. A torsion spring 168 secured to the post 166 resiliently urges the assembly in a counter-clockwise direction as seen in Figs. 10 and 11, so that a normal rest position is established when the arm 167 abuts the post 81.

To control the operation of the clutches 27, 29, the lock-out assembly 165 is provided with a stop arm 169 positioned to underlie a finger 155*a* on the latch 155 when the assembly is in its normal position, and a stop arm 170 adapted to underlie a finger 80*a* formed on the latch 80 when the assembly is swung in a clockwise direction from its rest position. With the lock-out assembly in its rest position, the finger 80*a* clears the stop arm 170 and the latch 80 is free to rotate, whereas when the assembly 165 is swung from its rest position to lock the latch 80, the lock arm 169 clears the finger 155*a* and the latch 155 is free to move.

It will therefore be seen that when the solenoid 21 is energized and the lock-out assembly 165 is in its normal rest position, the latch 80 will be operated and the cycle of the control clutch 27 initiated. At this time, the stop arm 169 will underlie the finger 155*a* so that the solenoid will be unable to move the latch 155 and the connecting spring 159 will simply stretch as the lever 86 is pivoted. When the lock-out assembly is swung from its rest position and the solenoid 21 is energized, the latch 155 will be free to operate and the stop arm 170 will underlie the finger 80*a* to prevent movement of the latch 80 whereupon the lost motion spring 89 will simply stretch as the solenoid rotates the arm 87.

Figure 7:
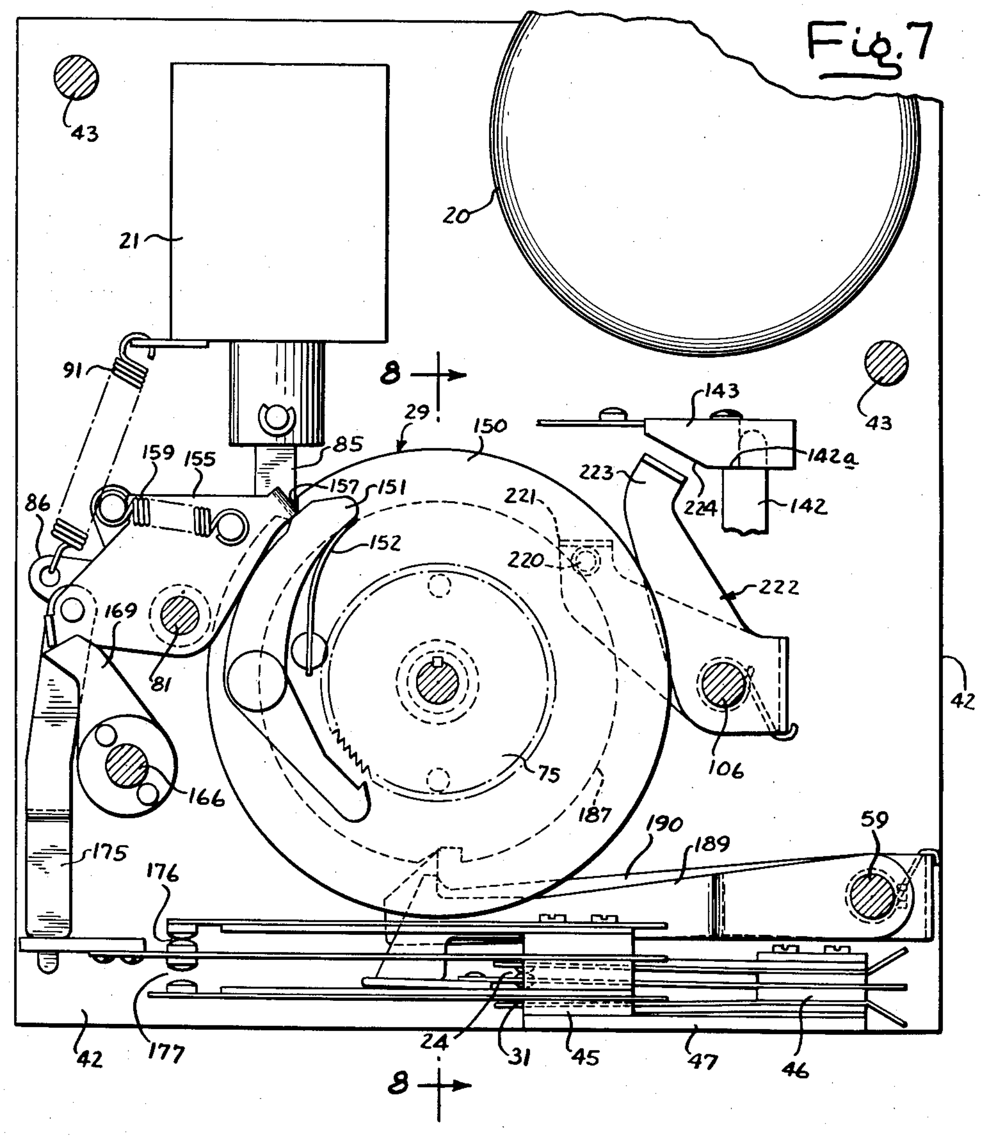
Fig. 7 is a section taken approximately along the line 7—7 of Fig. 2 but with the motor and solenoid shown in elevation for clarity of illustration.

Before turning to the functions performed during the operating cycle of the adaptor clutch 29, it may be noted that operation of the latch 155 is effective through a link 175 to open a set of contacts 176 and close a set of contacts 177 (see Figs. 7 and 12). It may also be noted that swinging the lock-out assembly 165 from its rest position is effective, through an arm 178 and a cam block 179, to open the contacts 26 and close the contacts 138 (see Figs. 10 and 12). The function of these contacts will be described in detail below.

Turning now to the function of the adaptor clutch 29, it may be seen, in Fig. 8 particularly, that the clutch disc 150 is a part of a switch operating assembly 185 which includes switch operating cams 186, 187 and 188. The entire assembly 185 is rotatably mounted on the drive shaft 44. Since the cams 186–188 rotate with the clutch disc 150, it will be understood that each of the cams rotates through one revolution during the adaptor clutch cycle.

The cam 186 is provided with an elongated, peripheral notch 186*a* (Fig. 6) and is effective, during the adaptor clutch cycle, to urge a switch operating arm 189 downwardly so as to open the contacts 24 and close the contacts 31 and thereby reverse the polarity of the source of direct current 22 for the purpose previously described.

The cam 187 is provided with a single, peripheral notch 187*a* and is effective, during the adaptor clutch cycle, to urge a double armed lever 190 downwardly so that a finger 191 will engage the contact carrying arm 62 and prevent closing of the contacts 23 under the control of the cam 55. Operation of the contacts 23 is thus prevented during the adaptor clutch cycle.

The cam 188 is provided with a plurality of closely spaced teeth 192, a low dwell portion 193, and a high dwell portion 194. The teeth 192 and the high dwell portion 194 cooperate with a switch operating arm 195 to close the contacts 32. In the preferred embodiment, there are 61 teeth 192 provided on the cam 188. During the correction cycle, keeping in mind that the cam 188 makes one full revolution a minute, the contacts 32 are closed briefly 61 times by the teeth 192, held open for about three seconds while the arm 195 drops in the low dwell portion 193, and then are closed again for a sustained two-second interval as the high dwell portion 194 swings the arm 195 downwardly.

It can therefore be seen that when the adaptor clutch 29 is released for operating through its cycle, the cams 186, 187 and 189 will all make one complete revolution with the clutch disc 150. The cam 186 opens the contacts 24 and closes the contacts 31 so as to reverse the polarity of the D.-C. source, the cam 187 holds open the contacts 23, and the cam 188 operates the contacts 32 so as to send a series of correction impulses of reversed polarity to the auto-set solenoid 12.

After the adaptor clutch cycle, when the latch finger 156 drops into the notch 157 on the periphery of the clutch disc 150, the cams 186–188 will be restored to their rest positions as shown in Fig. 6, wherein the contacts 24 will again be closed to establish a normal polarity D.-C. source and the finger 191 will be lifted by the cam 187 so that control of the contacts 23 will be returned to the cam 55.

In order to make the subsequent minute impulses transmitted by the cam 55 accurate to the nearest second following the adaptor clutch cycle and the correction impulses transmitted thereby, the adaptor clutch 29 rotates the cam 55 so that at the end of the clutch cycle the cam 55 is accurately positioned to transmit correctly timed normal minute impulses. In the preferred embodiment, such positioning of the cam 55 is permitted by coupling the driving gear 54 to the cam 55 by means of an overrunning clutch 200 (see Fig. 9). The clutch 200 includes a fine-toothed ratchet wheel 201 carried by the gear 54 and a spring pawl 202 carried by the cam 55. The pawl 202 is arranged so that the ratchet 201 is normally effective to engage the pawl 202 and rotate the cam 55 at its normal operating speed of ¼ r.p.m. It will be seen, however, that the clutch 200 will permit the cam 55 to be rotated at a higher speed whereupon the pawl 202 will simply idly ratchet over the teeth of the ratchet 201.

Secured to the cam assembly 185 for rotation with the adaptor clutch 29 is a four-toothed pawl 203 having four equally-spaced teeth 204 that are effective to cooperate with a spring pawl 205 mounted on the cam 55. It will be seen that upon rotation of the assembly 185 at a speed of 1 r.p.m. during the adaptor clutch cycle, one of the teeth 204 will engage the pawl 205 and carry the cam 55 at a rotational speed of 1 r.p.m. until the completion of the adaptor clutch cycle. During this movement, the pawl 202 will simply overrun the teeth on the ratchet 201.

The four teeth 204 correspond to the four cam lobes 56 on the cam 55. The arrangement of the parts is such that when the adaptor clutch 29 is in its normal rest position following completion of one cycle, and the pawl 205 rests against one of the teeth 204 having just been driven by the adaptor clutch, one of the cam lobes 56 is exactly angularly positioned so that precisely one minute must elapse before the contacts 23 are again closed by operation of the levers 57, 58. That is, whenever the adaptor clutch 29 comes to rest at the end of a cycle, one of the cam lobes 56 will have been swung around by the ratchet 203 so that the next normal minute impulse transmitted by the cam 55 will follow completion of the adaptor clutch cycle by a precisely predetermined amount. It will be understood, therefore, that when the master clock transmits a signal effective to institute operation of the adaptor clutch, the adaptor clutch not only transmits a series of correction impulses to the auto-set solenoid but also re-positions the normal impulse cam 55 so that subsequent operation of the cam will be correct to the nearest second.

It may be seen that during normal rotation of the cam 55 when the adaptor clutch 29 is idle, the pawl 205 will idly ratchet over the teeth 204.

For the purpose of initiating operation of the adaptor clutch 29, the control clutch disc 27 is provided with a lug 210 which strikes an arm 211 secured to the lock-out assembly 165 so as to rotate the lock-out assembly from its rest position (see Figs. 10 and 12). It will be recalled that rocking of the lock-out assembly 165 swings the stop arm 169 so as to release the latch 155 for operation and also causes the lock-out assembly arm 178 to engage the cam block 179 and close the contacts 138. If a proper coded signal has been received to move the stepped disc to its first position wherein the printed conductor **130*a* has closed the contacts 132, 133, then the closing of the contacts 138 by engagement of the lug 210 with the arm 211 will be effective to energize the adaptor solenoid 21. Since closing of the contacts 138 by rocking of the lock-out assembly 165 is also accompanied by a freeing of the latch 155, the resulting energization of the solenoid 21 will be effective to swing the latch 155 and release the adapter clutch 29** for operation through one cycle.

SUMMARY OF OPERATION

Figure 15:
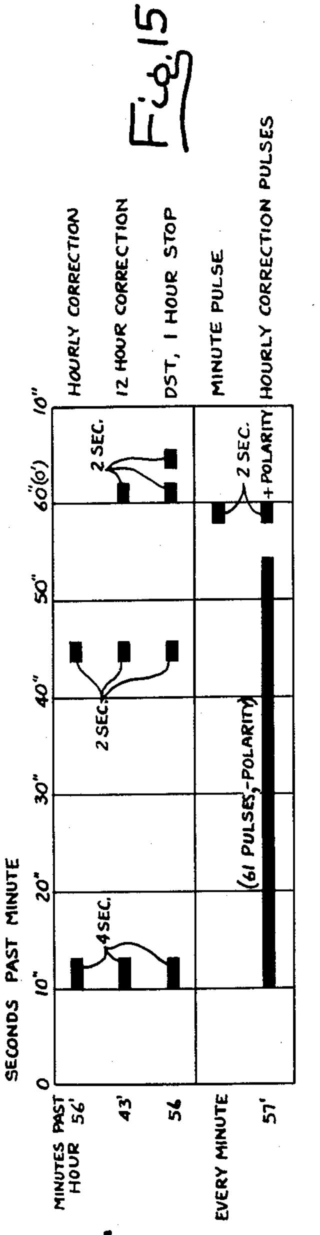
Fig. 15 is a chart showing the actuating codes and output impulses associated with the adaptor.

Having particular reference to Figs. 14 and 15, the operation of the adaptor 10 will be briefly summarized as it may be utilized in a typical installation. It will be understood the various times and time intervals are merely given as exemplary and may be varied if desired.

*Minute impulses*

The adaptor is connected to a conventional A.-C. power system 13 and is coupled to an auto-set controlled recorder 11. Every minute, the synchronous motor 20, by rotating the cam 55 at a constant speed, is effective to close the contacts 23 for a period of approximately two seconds. This completes a circuit from the source of direct current 22 to the auto-set solenoid 12 and the D.-C. impulse is effective to advance the recorder time indicating mechanism one minute.

*Hourly correction*

Every hour, the master clock transmits a high frequency coded signal over the power system 13 for the purpose of instituting an hourly correction cycle in the adaptor 10. The hourly correction signal comprises a first signal impulse beginning 56′10″ past the hour and lasting approximately four seconds. The signal impulse is detected by the coded signal receiver 14 and a circuit is completed through the normally closed contacts 26 to energize the adaptor solenoid 21. Since the signal is sustained for four seconds, the solenoid remains energized for this period and is effective to hold the latch 80 out of contact with the clutch disc 76 until the tail 82 of the clutch pawl 77 passes from beneath the latch finger 79 and the operating cycle of the control clutch 27 is initiated. The energization of the solenoid 21 will not be effective to operate the latch 155, since, it will be recalled, the stop arm 169 of the lock-out assembly 165 is disposed beneath the finger **155*a* on the latch 155**.

The rotation of the control clutch 27 proceeds at a uniform 1 r.p.m. throughout its one revolution cycle since the clutch is driven by the constantly driven drive ratchet 75 coupled directly to the synchronous motor 20. At approximately 56′44″ past the hour, a second coded signal impulse is received having a duration of approximately two seconds. Precisely at this time, the tooth **71*a*, driven by the control clutch 27, starts passing adjacent to the notch 112*a* on the stepped disc 28**.

The second coded signal impulse is therefore effective to energize the adaptor solenoid 21 through the closed contacts 26 and swing the interposer foot 111 into the notch **112*a* where it will be engaged by the tooth 71*a* so that the interposer 110 will be pulled downwardly to rotate the stepped disc 28. Since the second coded signal impulse has a sustained duration of two seconds, the interposer foot 111 will remain in the notch 112*a* until the stepped disc 28 rotates counter-clockwise, as seen in Fig. 11, far enough for the pawl 105 to pick up the tooth 104*a*. This locks the stepped disc in its first stepped position. When the solenoid 21 is de-energized, the spring 91 swings the interposer foot 111 out of the notch 112*a* and the interposer is restored upwardly by its spring 116**.

At the end of the control clutch cycle, when the time is 57′10″ past the hour, it being recalled that the cycle was instituted by the first signal impulse at 56′10″ past the hour, the lug 210 on the clutch disc 76 will engage the arm 211 on the lock-out assembly 165. The lock-out assembly is thus rocked to free the latch 155 and simultaneously close the contacts 138. Closing the contacts 138 will complete a circuit through the then closed contacts 132, 133 so as to energize the adaptor solenoid 21. Since the lock-out assembly 165 has been rocked, the latch 80 is blocked by the stop arm 170 so that the control clutch 27 is not again operated, but the latch 155, having been freed by the rocking of the stop arm 169, is operated and rotation of the adaptor clutch 29 is initiated.

As the adaptor clutch 29 starts rotation through its one-revolution cycle, it drives the cams 186–188 which, respectively, open contacts 24 and close contacts 31 to reverse polarity of the direct current source 22, block open the contacts 23, and begin the rapid closing of the contacts 32 so as to transmit a series of correction impulses of reversed polarity to the auto-set solenoid 12. The plurality of teeth 192 on the cam 188 are effective to transmit 61 rapid impulses of reverse polarity to the auto-set solenoid, and this series of impulses ends approximately 57′54″ past the hour. At 57′58″ past the hour, the high dwell portion 194 on the cam 188 closes the contacts 32 for a period of approximately two seconds, at which time the elongated dwell portion 186*a* on the cam 186 has opened the contacts 31 and again closed the contacts 24, so that a current impulse of normal polarity is transmitted to the auto-set solenoid 12 and the recorder 11 is advanced normally to indicate the 58th minute past the hour.

During rotation of the adaptor clutch 29, the four-toothed ratchet wheel 203 is effective to position the cam 55 so that a cam lobe 56 will not be effective to again close the contacts 23 until a full minute has elapsed. Therefore, the recorder 11 will not be advanced another minute until exactly 59 minutes past the hour.

*Twelve-hour correction*

A 12-hour correction signal is sent out on the power system 13 by the master clock once every 12 hours. This signal comprises a four-second impulse which begins at 43′10″ past the hour. The initial impulse is similar to the first impulse received in the hourly correction signal, and it functions in an identical manner to initiate operation of the control clutch 27. At 43′44″ past the hour, a second signal impulse is received which is effective to advance the stepped disc 28 one step in the same manner as when the hourly correction was received.

At 43′60″, i.e. 44′, past the hour, a third two-second signal impulse is received which is effective to energize the adaptor solenoid 21. This signal coincides with the passage of the tooth 71*b* past the stepped disc notch 112*b* and therefore, as the third signal impulse energizes the solenoid and swings the interposer foot 111 into the notch 112*b*, the tooth 71*b* will strike the interposer foot and advance the stepped disc a second step.

At the completion of the operating cycle of the control clutch 27, the lug 210 again strikes the arm 211 so that the latch 155 is released for operation and the contacts 138 closed. Closing of the contacts 138 completes a circuit through the normally closed contacts 176 and the contacts 131, 133, which are closed by the stepped disc in its second position, that places energization of the adaptor solenoid 21 under the control of the normally closed switch 35 in the recorder 11. It will be recalled that the switch 35 is operated by a 12-hour cam so that every 12 hours the switch is open. Thus, if the 12-hour correction signal is received when the recorder 11 is on time, the switch 35 will have been opened by the 12-hour cam and closing of the contacts 138 will not energize the adaptor solenoid 21.

If, however, the recorder 11 is late so that the switch 35 is still closed when the 12-hour correction signal is received by the adaptor 10, then closing of the contacts 138 completes a circuit that is effective to energize the adaptor solenoid 21. Energization of the solenoid while the lock-out assembly 165 is rocked from its rest position causes the operation of the adaptor clutch to be initiated in the same manner as when the hourly correction signal was received. In addition, however, rocking of the latch 155 to initiate operation of the adaptor clutch also causes the contacts 176 to open and the contacts 177 to close. Closing of the contacts 177 completes a circuit through the recorder switch 35 and the contacts 131, 133 which is effective to lock in the adaptor solenoid and maintain it in an energized condition. With the solenoid locked in, the latch 155 will not be effective to limit rotation of the adaptor clutch 29 to one cycle, and the adaptor clutch will continue to rotate as long as the solenoid remains energized.

During the continuous cycling of the adaptor clutch 29, repeated series of 61 rapid impulses of reverse polarity will be transmitted to the auto-set solenoid 12 in the same manner as when an hourly correction signal is received. These groups of impulses will be repeated until the recorder is brought up to the proper hour, whereupon the 12-hour cam opens the switch 35 and the solenoid 21 is de-energized. De-energization of the solenoid 21 stops the adaptor clutch at the completion of its then current cycle and normal operation of the recorder under the control of the cam 55 is resumed.

It will be understood that the recorder 11 will not be corrected to the nearest minute following the 12-hour correction operation. However, since this operation was begun at 43 minutes past the hour, a normal hourly correction signal will be received at 56 minutes past the hour, only a few minutes later, and the recorder will be then corrected to the nearest second.

*One-hour stop or daylight saving time correction*

When it is desired to delay advancing the recorder 11, as when it is desired to turn the recorder back an hour for purposes of daylight saving time correction, a special daylight saving time, or a one-hour stop, signal is transmitted to the adaptor 10. The first signal impulse occurs at 56′10″ past the hour and is sustained for four seconds. This signal initiates operation of the control clutch in the manner described above. At 56′44″ past the hour, a second signal impulse is transmitted to the adaptor which is effective to advance the stepped disc 28 one step as in the hourly correction and 12-hour correction operations. At 56′60″, i.e. at 57′, past the hour, a third signal is received which is effective to advance the stepped disc 28 a second step as when a 12-hour correction signal is received. At 57′4″ past the hour, a fourth signal impulse is received which coincides with the passage of the tooth 71*c* past the notch 112*c*. This causes the interposer foot 111 to be swung into the notch 112*c* so that the foot is struck by the passing tooth 71*c* and the stepped disc 28 is advanced to its third stepped position wherein the pawl 105 engages the tooth 104*c*.

With the stepped disc in its third step position, the contacts 131–133 are all open so that closing of the contacts 138 at the end of the control clutch cycle will not energize the adaptor solenoid. In addition, movement of the stepped disc into its third stepped position will open the contacts 25 and prevent the motor 20, through the cam 55, from sending current impulses to the auto-set solenoid 12. The recorder 11 is therefore not advanced as long as the contacts 25 remain open.

For the purpose of enabling the stepped disc 28 to open the contacts 25, a pin 140 is carried on the outer face of the stepped disc (see Fig. 11) in position to engage a finger 141 on a latch 142 when the disc is moved into its third step position. The latch 142 is pivoted on the post 106 and has a ledge 142*a* which supports a spring arm 143 carrying the lower one of the contacts 25. When the pin 140 engages the finger 141, the latch is rocked clockwise, as seen in Fig. 11, and the ledge 142*a* is moved from under the arm 143 permitting the latter to drop and open the contacts 25.

In order to close the contacts 25 at the end of an hour so that the recorder 11 is set back exactly sixty minutes, the cam 86 is provided with an axially extending pin 220 which closely underlies an arm 221 of a two-armed lever 222 (see Figs. 7 and 8). The other arm 223 of the lever 222 is adapted to strike a cam surface 224 on the contact-supporting spring arm 143. The latch 142 is resiliently urged toward its latching position against a stop pin 225 by a tensioned spring 226 (see Fig. 11).

It will therefore be seen that when an hourly correction coded signal impulse is received to initiate operation of the adaptor clutch 29, the first movement of the cam assembly 185 will cause the pin 220 to strike the arm 221 and swing the lever 222 in a clockwise direction, as shown in Fig. 7, so that the arm 223 strikes the cam surface 224 and raises the spring arm 143 to close the contacts 25. As the spring arm 143 is raised, the latch 142 will be swung by its spring 226 against the stop 225, and the latching ledge **142*a* will be disposed beneath the spring 143 to hold the contacts 25** closed.

It will therefore be understood that the next hourly correction signal received by the adaptor 10 following its response to a daylight saving time signal will restore the normally closed contacts 25 to their closed position. The recorder 11 is therefore normally advanced after a delay of exactly one hour.

In the above discussion, the adaptor 10 has been described as being responsive to a certain pattern of signal impulses. It will be recalled that this pattern is dependent upon the angular positions of the teeth **71*a*–71*c* on the toothed wheel 71 and that therefore by simply changing the tooth segment 120** which carries the several teeth and substituting another segment having teeth in alternate positions will be effective to change the code to which the adaptor will respond.

I claim as my invention:

1. An adaptor for operating, on an A.-C. power system, a D.-C. timing device which includes a timer switch that is operated only when the device indicates a selected time interval, comprising, in combination, a synchronous motor energized from said A.-C. system, a rectifier connected to said A.-C. system for providing a D.-C. source, means operated by said motor for normally transmitting to said device from said D.-C. source a regularly intermittent series of current impulses of desired polarity, receiver means response to respective ones of three sets of coded signal impulses from an external source, means operated by said receiver means when one set of impulses is received for transmitting to said device from said D.-C. source a rapid predetermined series of current impulses of reverse polarity, means operated by said receiver means when a second set of impulses is received and including said timer switch for transmitting to said device from said D.-C. source a rapid unlimited series of current impulses of reversed polarity lasting until said timer switch is no longer operated, and means operated by said receiver means when a third set of impulses is received for preventing further D.-C. current impulses from being transmitted to said device.

2. An adaptor for operating, on an A.-C. power system, a D.-C. timing device having a timer switch which is operated only when the device indicates a selected time interval, comprising, in combination, a synchronous motor energized from said A.-C. system, a rectifier connected to said A.-C. system for providing a D.-C. source, means including a first cam-controlled switch operated by said motor for normally transmitting to said device from said D.-C. source a regularly intermittent series of current impulses of desired polarity, a stepped disk and means for selectively advancing said disk, from a rest position one, two, or three steps in response to respective ones of three sets of coded signal impulses from an external source, means operated by said disk when in its first stepped position for transmitting to said device from said D.-C. source a rapid, predetermined series of current impulses of reverse polarity, means operated by said disk when in its second stepped position and including said timer switch for transmitting to said device from said D.-C. source a rapid unlimited series of current impulses of reverse polarity lasting until said timer switch is no longer operated, and means operated by said disk when in its third stepped position for preventing further D.-C. current impulses from being transmitted to said device until said disk is next advanced to its first stepped position.

3. An adaptor for operating, on an A.-C. power system, a D.-C. timing device having a timer switch which is operated only when the device indicates a selected time interval, comprising, in combination, a synchronous motor energized from said A.-C. system, a rectifier connected to said A.-C. system for providing a D.-C. source, means including a first cam-controlled switch operated by said motor for normally transmitting to said device from said D.-C. source a regularly intermittent series of current impulses of desired polarity, a stepped disk and means for selectively advancing said disk from a rest position one or two steps in response to respective ones of two sets of coded signal impulses from an external source, means operated by said disk when in its first stepped position for transmitting to said device from said D.-C. source a rapid predetermined series of current impulses of reverse polarity, and means operated by said disk when in its second stepped position and including said timer switch for transmitting to said device from said D.-C. source a rapid unlimited series of current impulses of reversed polarity lasting until said timer switch is no longer operated.

4. An adaptor for operating a D.-C. timing device on an A.-C. power system comprising, in combination, a synchronous motor energized from said A.-C. system, a rectifier connected to said A.-C. system for providing a D.-C. source, means including a first cam-controlled switch operated by said motor for normally transmitting to said device from said D.-C. source a regularly intermittent series of current impulses of desired polarity, a stepped disk and means for selectively advancing said disk from a rest position one or two steps in response to respective ones of two sets of coded signal impulses from an external source, means operated by said disk when in its first stepped position for transmitting to said device from said D.-C. source a rapid predetermined series of current impulses of reverse polarity, and means operated by said disk when in its second stepped position for preventing further D.-C. current impulses from being transmitted to said device until said disk is next advanced to its first stepped position.

5. In an adaptor for operating a D.-C. timing device on an A.-C. power system, comprising, in combination, a constant speed motor, a source of D.-C. current, means operated by said motor for normally transmitting to said device from said D.-C. source a regularly intermittent series of current impulses of desired polarity, a one-revolution control clutch whose operation is initiated by a control signal on said A.-C. system, a stepped disk and means associated with said control clutch for advancing said disk one step in response to a second control signal impulse following at a preselected interval the start of the control clutch cycle, and means operated by said clutch if said disk has been advanced for reversing the polarity of said D.-C. source and for transmitting to said device from said source a rapid series of current impulses of reverse polarity.

6. In an adaptor for operating a D.-C. timing device on an A.-C. power system, comprising, in combination, a constant speed motor, a source of D.-C. current, means including a first cam-controlled switch operated by said motor for normally transmitting to said device from said D.-C. source a regularly intermittent series of current impulses of desired polarity, a one-revolution control clutch whose operation is initiated by a first control signal on said A.-C. system, a stepped disk and means associated with said control clutch for advancing said disk one step in response to a second control signal following at a preselected interval the start of the control clutch cycle, a one-revolution adaptor clutch including means for initiating its operating cycle at the end of the control clutch cycle only if said disk has been previously advanced one step and means operated by said adaptor clutch for reversing the polarity of said D.-C. source and for transmitting to said device from said source a rapid series of current impulses of reverse polarity.

7. In an adaptor for operating a D.-C. timing device on an A.-C. power system in response to coded control signal impulses of predetermined duration, comprising, in combination, a synchronous motor energized from said A.-C. system, a rectifier connected to said A.-C. system for providing a source of D.-C. current, means including a first cam-controlled switch operated by said motor for normally transmitting to said device from said D.-C. source a regularly intermittent series of current impulses of desired polarity, a solenoid adapted to be energized by a control signal impulse, means including a one-revolution control clutch operated by said solenoid so as to cycle when the latter is energized by a signal impulse, means for restoring said clutch to its normal rest position unless the solenoid remains energized for a predetermined time interval, a stepped disk and means associated with said control clutch for advancing said disk one step in response to energization of said solenoid by a second control signal impulse following at a preselected period the start of the control clutch cycle, means for restoring said stepped disk to its normal rest position unless the energization of said solenoid at said period lasts for a predetermined interval, a one-revolution adaptor clutch including means for initiating its operating cycle at the end of the control clutch cycle only if said disk has been previously advanced one step, means operated by said adaptor clutch during its cycle for locking open said first switch, and means including two cam-controlled switches also operated by said adaptor clutch for reversing the polarity of said D.-C. source and for transmitting to said device from said source a rapid series of current impulses of reverse polarity.

8. In an adaptor for operating a D.-C. timing device on an A.-C. power system, comprising, in combination, a synchronous motor energized from said A.-C. system, a rectifier connected to said A.-C. system for providing a source of D.-C. current, means including a first cam-controlled switch operated by said motor for normally transmitting to said device from said D.-C. source a regularly intermittent series of current impulses of desired polarity, a solenoid adapted to be energized by a first control signal impulse, means including a one-revolution control clutch operated by said solenoid so as to cycle when the latter is energized by a signal impulse, a stepped disk and means associated with said control clutch for advancing said disk one step in response to energization of said solenoid by a second control signal impulse following at a preselected interval the start of the control clutch cycle, a one-revolution adaptor clutch including means for initiating its operating cycle at the end of the control clutch cycle only if said disk has been previously advanced one step, means operated by said adaptor clutch for locking open said first switch, and means including two cam-controlled switches also operated by said adaptor clutch for reversing the polarity of said D.-C. source and for transmitting to said device from said source a rapid series of current impulses of reverse polarity.

9. An adaptor for controlling a D.-C. timing device having a timer switch which is operated only when the device indicates a preselected time period, comprising, in combination, a constant speed motor, a source of D.-C. current, means including a first cam-controlled switch operated by said motor for normally transmitting to said device from said D.-C. source a regularly intermittent series of current impulses of desired polarity, a one-revolution control clutch whose operation through a cycle is initiated by a first control signal impulse, a stepped disk and means associated with said control clutch for advancing said disk a step in response to a second control signal impulse following at a preselected interval the start of the control clutch cycle, an adaptor clutch including electrical means for initiating its operation, means including a switch connected in series with said timer switch and operated by said disk when advanced said step for activating said electrical means so that operation of said adaptor clutch is initiated if the disk has been advanced two steps and the timer switch is operated, and means operated by said adaptor clutch for rapidly advancing said timing device until said selective time period is indicated and said timer switch is no longer operated.

10. An adaptor for controlling, from an A.-C. system, a D.-C. timing device having a timer switch which is operated only when the device indicates a preselected time period, comprising, in combination, a synchronous motor energized from said A.-C. system, a rectifier connected to said A.-C. system for providing a source of D.-C. current, means including a first cam-controlled switch operated by said motor for normally transmitting to said device from said D.-C. source a regularly intermittent series of current impulses of desired polarity, a solenoid adapted to be energized by a control signal impulse, means including a one-revolution control clutch operated by said solenoid so as to be cycled when the latter is energized, a stepped disk and means associated with said control clutch for advancing said disk a step in response to energization of said solenoid by a control signal impulse following at a preselected interval the start of the control cycle, an adaptor clutch including means for initiating its operation when said solenoid is energized simultaneously with the end of the control cycle, means including a switch connected in series with said timer switch operated by said disk when advanced said step for energizing said solenoid at the end of the disk operating cycle so that operation of said adaptor clutch is initiated if the disk has been advanced said step and the timer switch is operated, and means operated by said adaptor clutch for rapidly advancing said timing device until said selective time period is indicated and said timer switch is no longer operated.

11. An adaptor for controlling, from an A.-C. system, a D.C. timing device having a timer switch which is operated only when the device indicates a preselected time period, comprising, in combination, a synchronous motor energized from said A.-C. system, a rectifier connected to said A.-C. system for providing a source of D.-C. current, means including a first cam-controlled switch operated by said motor for normally transmitting to said device from said D.-C. source a regularly intermittent series of current impulses of desired polarity, a solenoid adapted to be energized by a first control signal impulse, means including a one-revolution control clutch operated by said solenoid so as to be cycled when the latter is energized, a stepped disk and means associated with said control clutch for advancing said disk one step in response to energization of said solenoid by a second control signal impulse following at a preselected interval the start of the control clutch cycle, means associated with said control clutch for advancing said disk a second step in response to energization of said solenoid by a third control signal impulse following at a preselected interval said second impulse, a cam associated with said disk for disabling said last named means unless the disk has previously been advanced one step, an adaptor clutch including means for initiating its operation when said solenoid is energized simultaneously with the end of the control cycle, means including a switch connected in series with said timer switch and operated by said disk when advanced a second step for energizing said solenoid at the end of the disk operating cycle so that operation of said adaptor clutch is initiated if the disk has been advanced two steps and the timer switch is operated, and means operated by said adaptor clutch for rapidly advancing said timing device until said selective time period is indicated and said timer switch is no longer operated.

12. An adaptor for controlling a D.-C. timing device from an A.-C. system, comprising, in combination, a synchronous motor energized from said A.-C. system, a rectifier connected to said A.-C. system for providing a source of D.-C. current, means including a first cam-controlled switch operated by said motor for normally transmitting to said device from said D.-C. source a regularly intermittent series of current impulses of desired polarity, a solenoid adapted to be energized by a control signal impulse, a one-revolution control clutch operated by said solenoid so as to cycle when the latter is energized, means including a stepped disk and means associated with said control clutch for advancing said disk a step in response to energization of said solenoid by another control signal impulse following at a preselected interval the start of the control clutch cycle, means including a switch operated by said disk in its said stepped position for preventing said current impulses from being transmitted to said device, and means for releasing said last named switch incident to the next operation of said control clutch.

13. An adaptor for controlling a D.-C. timing device from an A.-C. system, comprising, in combination, a synchronous motor energized from said A.-C. system, a rectifier connected to said A.-C. system for providing a source of D.-C. current, means including a first cam-controlled switch operated by said motor for normally transmitting to said device from said D.-C. source a regularly intermittent series of current impulses of desired polarity, a solenoid adapted to be energized by a first control signal impulse, means including a one-revolution control clutch operated by said solenoid so as to cycle when the latter is energized, a stepped disk and means associated with said control clutch for advancing said disk one step in response to energization of said solenoid by a second control signal impulse following at a preselected interval the start of the control clutch cycle, means associated with said control clutch for advancing said disk a second step in response to energization of said solenoid by a third control signal impulse following at a preselected interval said second impulse, a cam associated with said disk for disabling said last named means unless the disk has previously been advanced one step, a utilization circuit conditioned for operation by said disk when the latter is in its said first or second stepped positions, means associated with said control clutch for advancing said disk a third step in response to energization of said solenoid by a fourth control signal impulse following at a preselected interval said third impulse, means including a switch operated by said disk in its third stepped position for preventing said current impulses from being transmitted to said device, and means for releasing said last named switch incident to the next operation of said control clutch.

14. A coded signal responsive mechanism comprising, in combination, a solenoid having an armature which is shiftable in response to receipt of a signal impulse, a constant speed motor, a wheel journaled for rotation and having a radially extending tooth, means including a clutch for coupling said toothed wheel to said constant speed motor in response to shifting of said armature, a stepped disk journaled adjacent to said wheel and having a drive notch adjacent the circular path of said tooth, an interposer having a foot adapted to swing both within said notch and into the arcuate path of said tooth, and means coupling said interposer to said armature so that shifting of the armature will swing the interposer foot into the notch, the arrangement thus permitting a first signal impulse to initiate a single revolution of said wheel at a constant speed and a second signal impulse, timed from the first signal to coincide with the movement of said tooth adjacent said notch, to cause said foot to swing into said drive notch and be struck by said tooth so as to advance said disk one step.

15. A coded signal responsive mechanism comprising, in combination, a solenoid having an armature which is shiftable when the mechanism receives a signal impulse, a constant speed motor, a wheel journaled for rotation and having a radially extending tooth, means including a one-revolution clutch for coupling said toothed wheel to said constant speed motor through one revolution of the wheel in response to shifting of said armature, a stepped disk journaled coaxially with and adjacent to said wheel, detent means associated with said disk for establishing a series of incremental, arcuate steps in which said disk may be resiliently latched, said disk having a drive notch adjacent the circular path of said tooth, an interposer having a foot adapted to swing both within said notch and into the arcuate path of said tooth, a pivoted member carrying said interposer and providing a resilient lost-motion, slidable support therefor, and means coupling said member to said armature so that shifting of the armature will swing the interposer foot into the notch, the arrangement thus permitting (1) a first signal impulse to initiate a single revolution of said wheel at a constant speed and (2) a second signal impulse, timed from the first signal to coincide with the movement of said tooth adjacent said notch, to cause said foot to swing into said drive notch and be struck by said tooth so as to slide said interposer and advance said disk one step.

16. A coded signal responsive mechanism comprising, in combination, a solenoid having an armature which is shiftable when the mechanism receives a signal impulse, a constant speed motor, a wheel journaled for rotation and having a first radially extending tooth, a pawl pivoted on said wheel and having a second radially extending tooth and a cam follower portion, a one-revolution clutch for coupling said toothed wheel to said constant speed motor through one revolution of the wheel in response to shifting of said armature, a stepped disk journaled coaxially with and adjacent to said wheel, said disk being biased into a rest position, detent means associated with said disk for establishing a series of incremental, arcuate steps from said rest position in which said disk may be resiliently latched, said disk having drive notches adjacent the circular path of said teeth, an interposer having a foot adapted to swing into an active position within one of said notches and into the arcuate path of said teeth, a cam secured to said disk and cooperable with said pawl cam follower portion, said cam having a lobe for holding the pawl tooth radially extended as it swings through said active position of said foot, said lobe being positioned on said disk so that the pawl tooth is not so held when the disk is in its rest position, a pivoted member carrying said interposer and providing a resilient lost-motion, slidable support therefor, and means coupling said member to said armature so that shifting of the armature will swing the interposer foot into the notch, the arrangement thus permitting (1) a first signal impulse to initiate a single revolution of said wheel at a constant speed, (2) a second signal impulse, timed from the first signal to coincide with the movement of said first tooth through said foot active position, to cause said foot to swing into one of said drive notches and be struck by said first tooth so as to slide said interposer and advance said disk one step, and (3) a third signal impulse, timed from the second signal to coincide with the movement of said pawl tooth through said foot active position to cause said foot to swing into one of said drive notches and be struck by said pawl tooth so as to advance said disk a second step, said cam preventing a properly timed third signal from moving the disk unless a properly timed second signal had previously been received.

17. In an adaptor for providing D.-C. impulses to an auto-set device, the combination comprising, a switch in circuit with said auto-set device, cam controlled operating means for said switch, a rotatable cam having an operating portion cooperable with said means so as to momentarily operate said switch upon rotation of said cam, a first drive for said cam effective to rotate the cam at a normal, uniform, predetermined rate, said first drive including an over-running drive ratchet permitting the cam to be rotated at a higher speed, a correction impulse transmitting mechanism selectively operable for imparting a correction signal to said auto-set device, said mechanism including a second drive for said cam having a normal rest position and being effective to operate through an exactly timed cycle each time said correction mechanism is selectively operated, said second drive also being effective, when cycling, to rotate said cam at a higher speed than said first drive, said second drive including a drive ratchet having a single tooth positioned with respect to said cam operating portion and said second drive rest position so that the cam operating portion will be exactly oriented with respect to said switch operating means each time the second drive completes a correcting cycle and the first drive resumes normal cam rotation, whereby normal operation of said switch follows the correction cycle by a precisely preselected time interval.

18. In an adaptor responsive to coded signal impulses, the combination comprising, a solenoid having an armature which is shiftable when the adaptor receives a signal impulse, a drive ratchet coupled to a motor so as to be uniformly rotated, a pair of clutch wheels sandwiching said ratchet and being coaxially but freely mounted therewith, each of said wheels carrying a pivoted clutch pawl resiliently urged toward engagement with said drive ratchet, said ratchet and said wheels being adapted to rotate in unison when the respective pawls engage the ratchet, a pair of movable clutch latches each one engaging a respective one of said pawls so as to restrain the pawls from engagement with the ratchet, a resilient lost motion connection coupling each of said latches with said armature so that shifting of the armature will urge said latches out of contact with said pawls, a shiftable lock arm for each of said latches effective to block latch movement from said pawls, and means coupling said lock arms so that one latch or the other is free to operate, whereby manipulation of said coupled lock arms will permit selective rotation of either of said clutch wheels for one revolution upon receipt of a signal impulse.

19. In an adaptor responsive to coded signal impulses of predetermined duration, the combination comprising, a solenoid having an armature which is shiftable when the adaptor receives a signal impulse, a drive ratchet coupled to a motor so as to be uniformly rotated, a pair of clutch wheels sandwiching said ratchet and being coaxially but freely mounted therewith, each of said wheels carrying a pivoted clutch pawl resiliently urged toward engagement with said drive ratchet, said ratchet and said wheels being adapted to rotate in unison when the respective pawls engage the ratchet, said pawls each having an elongated tail, a pair of movable clutch latches each one engaging the tail of a respective one of said pawls so as to restrain the pawls from engagement with the ratchet, a resilient lost-motion connection coupling each of said latches with said armature so that shifting of the armature will urge said latches out of contact with the tails of said pawls, a shiftable lock arm for each of said latches effective to block latch movement from said pawls, and means coupling said lock arms so that one latch or the other is free to operate, whereby manipulation of said coupled lock arms will permit selective rotation of either of said clutch wheels for one revolution upon receipt of a signal impulse of sufficient duration to hold the unblocked latch from the associated pawl until the latter's elongated tail is carried from the path of the latch.

References Cited in the file of this patent

UNITED STATES PATENTS

| | | |
|---|---|---|
| 2,568,836 | Tobler | Sept. 25, 1951 |
| 2,677,030 | Frey | Apr. 27, 1954 |
| 2,700,757 | Bradley | Jan. 25, 1955 |
| 2,862,116 | Hurlimann | Nov. 25, 1958 |

FOREIGN PATENTS

| | | |
|---|---|---|
| 631,192 | Great Britain | Oct. 28, 1949 |